United States Patent
Hamaguchi et al.

(10) Patent No.: US 7,923,967 B2
(45) Date of Patent: Apr. 12, 2011

(54) METHOD FOR CONTROLLING BATTERY PACK

(75) Inventors: Hitoshi Hamaguchi, Sumoto (JP); Toru Nishikawa, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 258 days.

(21) Appl. No.: 11/703,155

(22) Filed: Feb. 7, 2007

(65) Prior Publication Data

US 2007/0188141 A1    Aug. 16, 2007

(30) Foreign Application Priority Data

Feb. 8, 2006 (JP) ................................ 2006/031684

(51) Int. Cl.
*H02J 7/00* (2006.01)
*H02J 7/04* (2006.01)

(52) U.S. Cl. ........ 320/134; 320/116; 320/136; 320/148; 320/162

(58) Field of Classification Search .................. 320/116, 320/134, 136, 148, 152, 162; 324/426, 433, 324/436
See application file for complete search history.

(56) References Cited

U.S. PATENT DOCUMENTS

| | | | | |
|---|---|---|---|---|
| 6,268,713 B1 * | 7/2001 | Thandiwe | ....................... | 320/134 |
| 6,873,135 B2 * | 3/2005 | Nakatsuji | ....................... | 320/132 |
| 7,436,151 B2 * | 10/2008 | Wang et al. | ..................... | 320/134 |
| 2002/0105305 A1 * | 8/2002 | Yagi et al. | ...................... | 320/148 |
| 2006/0108982 A1 * | 5/2006 | Daou et al. | ..................... | 320/116 |

FOREIGN PATENT DOCUMENTS

| | | |
|---|---|---|
| JP | 56-150921 | 11/1981 |
| JP | 7-170650 | 7/1995 |
| JP | 9-261883 | 10/1997 |
| JP | 11-234910 | 8/1999 |
| JP | 2000-340267 | 12/2000 |
| JP | 2003-337146 | 11/2003 |

OTHER PUBLICATIONS

Japanese Office Action issued Mar. 30, 2010 in Application No. 2006-031684.

* cited by examiner

*Primary Examiner* — Edward Tso
*Assistant Examiner* — Johali A Torres Ruiz
(74) *Attorney, Agent, or Firm* — Wenderoth, Lind & Ponack, L.L.P.

(57) ABSTRACT

A method controls a battery pack that includes a rechargeable battery, a control circuit that controls charge operation of the battery, and a charge control element that controls the charge current through the control circuit. In the method, even though the control circuit controls the charge control element so that the charge control element turns to OFF, in a case where the charge current is detected, the control circuit determines that abnormality occurs if detecting that the current flows at a rate not less than a first current value during a first detection period, and additionally determines that abnormality occurs if detecting a state the current flows at a rate less than the first current value for a second detection period longer than the first detection period.

13 Claims, 4 Drawing Sheets

METHOD FOR CONTROLLING BATTERY PACK

BACKGROUND OF THE INVENTION

1. Field of the Invention

The present invention relates a method for controlling a battery pack.

2. Description of the Related Art

Japanese Laid-Open Publication KOKAI No. HEI 9-261883 discloses various types of battery abnormality detection, which detect states where rechargeable batteries cannot be properly used due to deterioration of the rechargeable batteries, large property variation between them, a short circuit in any of them, or the like. If such states are detected, charge operation (or discharge operation) is stopped. Specifically, the various types of detection includes the steps of detecting battery voltage of a rechargeable battery in charge operation, comparing the detected battery voltage with a preset voltage value, and stopping charging the rechargeable battery if the detected battery voltage is not less than the preset voltage value for longer than a preset period. In addition, as disclosed in paragraph 0020, it is also determined whether charge and discharge control switches are properly disconnected.

SUMMARY OF THE INVENTION

This type of charge control switch disconnection determination is made based on whether a current value not less than a preset value is detected in disconnection control operation. However, even in disconnection control operation, if a battery pack or electronic equipment using it is under the influence of noise, such a current value is occasionally detected. In this case, it may be falsely determined that abnormality occurs in the charge control switch. Particularly, a battery pack or electronic equipment using it tends to be subjected to this type of influence of noise when electronic devices such as mobile phone that generate radio wave are used near the battery pack or electronic equipment. On the other hand, in order to reduce this type of false determination due to the influence of noise, it is conceivable that the aforementioned preset value for current value determination is set to a large value. However, in the case where the preset value is set to a large value, there is a problem that cannot determine an abnormal state where a small amount of current flows.

The present invention is aimed at solving the above problem, and its object is to provide a method for controlling a battery pack that more appropriately and accurately determines abnormality of a charge control switch.

A method according to the present invention controls a battery pack that includes a rechargeable battery, a control circuit that controls charge operation of the battery, and a charge control element that controls the charge current through the control circuit. In the method, even though the control circuit controls the charge control element so that the charge control element turns to OFF, in a case where the charge current is detected, the control circuit determines that abnormality occurs if detecting that the current flows at a rate not less than a first current value during a first detection period, and additionally determines that abnormality occurs if detecting that the current flows at a rate less than the first current value for a second detection period longer than the first detection period.

In the aforementioned control method, it is determined that abnormality occurs if it is detected that the current flows at a rate not less than the first current value during the first detection period, for example, it is determined that abnormality occurs if it is detected that a large amount of current not less than the first current value flows during the first detection period shorter than the second detection period. Therefore, since a large current flow can be detected in a short period, it is possible reduce an adverse influence on the battery. In other words, it is possible to quickly stop charging a battery pack in an abnormal state, and to quickly stop charging a highly abnormal battery.

Since it is determined that abnormality occurs if it is detected that the current flows at a rate less than the first current value during the second detection period longer than the first detection period, for example, it is determined that abnormality occurs if it is detected that a small amount of current less than the first current value flows during the second detection period shorter than the first detection period, influence due to fleeting noise is eliminated. Therefore, it is possible to properly determine abnormality.

In addition, as discussed in the aforementioned problem, although, in order to reduce false determination due to the influence due to noise, it is conceivable that the aforementioned preset value for current value determination is set to a large value, in a case where the preset value is set to a large value, there is a problem that cannot determine an abnormal state where a small amount of current flows. However, in the present invention, according to the aforementioned construction, that is, determination that determines that abnormality occurs if it is detected that current less than the first current value flows during the second detection period shorter than the first detection period, therefore, abnormality can be determined based on even a small current flow.

The above and further objects of the present invention as well as the features thereof will become more apparent from the following detailed description to be made in conjunction with the accompanying drawings.

DETAILED DESCRIPTION OF THE PREFERRED EMBODIMENT

Figure 1:
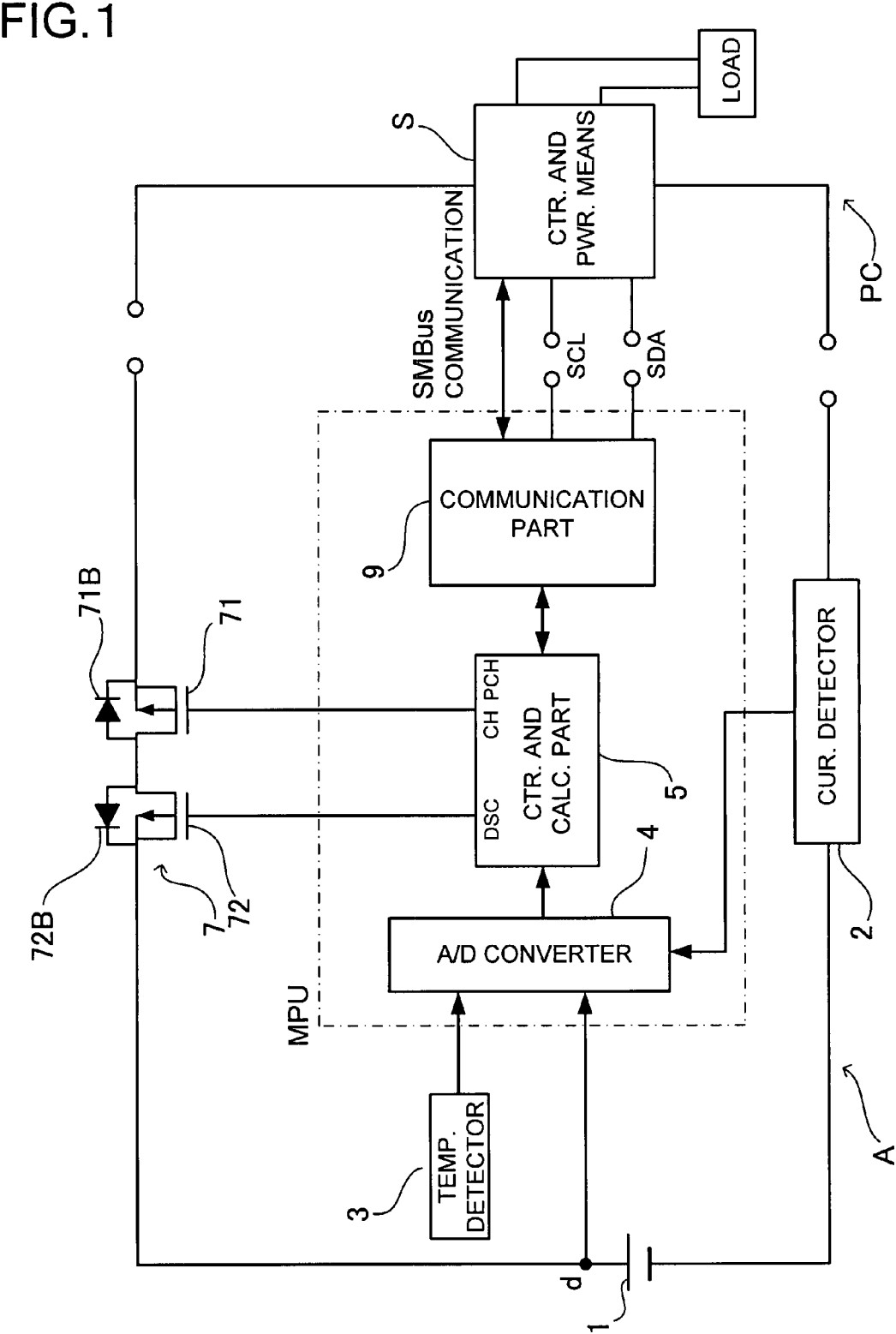
FIG. 1 is a circuit block diagram of a battery pack according to one embodiment of the present invention.

An embodiment of the present invention will be described with reference to drawings. As shown in FIG. 1, a battery pack A, and a mobile device PC as electronic equipment with a power source, which charges the battery pack A, are provided in this embodiment. The mobile device PC is a mobile personal computer such as note type personal computer. Typically, the battery pack A has structure that can be detachably attached to the mobile device PC. The mobile device PC includes control-and-power means S. The control-and-power means S is provided with direct-current power, which is provided from an adaptor (not shown). The adaptor converts commercial alternating-current power through a wall outlet into the direct-current power. The control-and-power means S includes a microcomputer, which controls this power for power supply. The power supply from the control-and-power means S is used to charge the battery pack A or is provided to a load L of the mobile PC. On the other hand, when power is not provided from the commercial power supply, power is provided from the battery pack A, and the provided power operates the power circuit S and the load L.

The battery pack A includes a rechargeable battery 1 such as lithium-ion battery and nickel-hydrogen battery, a current detection portion 2, and a microprocessor unit (hereinafter referred to as "MPU"). The current detection portion 2 detects current in the battery 1 in charge/discharge operation, and is composed of a resistor or the like. The MPU monitors and controls charge/discharge operation for the battery 1. In addition, the battery pack A includes a temperature detection portion 3 containing a thermistor located close to the battery 1. In a case where the batter 1 is a lithium-ion rechargeable battery, three or four battery cells are used in a serial connection state. Each of the battery cells has about 2000 mAh/cell when providing power to the mobile device PC. Additional cells may be connected in parallel to increase the battery capacity of the battery pack A.

The MPU includes an A/D conversion portion 4 that is provided with battery voltage (measured at a point d) and analog voltage of outputs from the current and temperature detection portions 2 and 3, and coverts them into digital data to calculate an actual voltage (mV), an actual current value (mA) and so on. Outputs are provided from the A/D conversion portion 4 to a charge/discharge control and calculation portion 5 as a control circuit. The control and calculation portion 5 performs calculation, comparison, determination and so on. A control component 7 is controlled with signals from the control and calculation portion 5 so that the control component 7 turns to ON/OFF. The control component 7 is composed of switching transistors or the like.

In other words, the control-and calculation portion 5 integrates charge/discharge current values for remaining capacity calculation processing, detects full-charge of the battery 1, and controls charge/discharge operation if detecting abnormal current, abnormal temperature or abnormal voltage. The control component 7 composed of switching transistors or the like is controlled to ON/OFF, and thus cuts current based on the control signals from the control and calculation portion 5 if abnormal current, abnormal temperature or abnormal voltage is detected. The control and calculation portion 5 integrates values each of which is obtained by multiplying a charge/discharge current converted by the A/D conversion portion 4 by a measurement unit period (e.g., 250 msec). The control and calculation portion 5 can subtract the value obtained by the integration from a full-charge value in discharge operation. In charge operation, the control and calculation portion 5 can add the value obtained by the integration to the remaining capacity when the charge operation is started. Such calculation is known in the art. The remaining capacity (Ah) of the battery 1 is calculated based on this type of calculation. Instead of the remaining capacity based on this type of current integration, the control and calculation portion 5 can calculate power integration value (Wh) as the remaining capacity. The power integration value (Wh) can be obtained by integrating values each of which is obtained by multiplying voltage and current at a measurement point by the measurement unit period.

The control and calculation portion 5 stores various types of data in memories. The control and calculation portion 5 includes a CPU (central processing unit), and includes various types of memories. The control and calculation portion 5 includes a program memory that stores a program for controlling operation of the battery pack A. The program memory is a nonvolatile storage medium. A ROM (read-only memory) previously stores data required for program execution and so on. A RAM (random-access memory) temporarily stores a part of program and various types of data. The control and calculation portion 5 additionally includes an EEPROM (electrically erasable programmable ROM) or a flash memory. The EEPROM or flash memory stores software for execution of the CPU, set data, data required to be saved even if the MPU shuts down (e.g., learned capacity, cycle number, data of abnormal state, etc.), and so on before the shutdown happens. The EEPROM or flash memory can rewrite them if necessary.

The control and calculation portion 5 additionally includes various types of timers and counters. They are used for time measurement, count measurement, and so on.

In a case where the battery 1 is a nickel-hydrogen battery or the like, the control and calculation portion 5 determines the full-charge state in a known manner such as detection of the peak voltage or $-\Delta V$ of battery voltage (=voltage drop), and the use of the calculated remaining capacity. In a case where the battery 1 is a lithium-ion battery, through the use of constant current (maximum current about 0.5 to 1 C) and constant voltage (maximum about 4.2 V/cell) charge operation in which current and voltage are regulated, the full-charge state is determined when voltage is not less than a preset value, and when current is not more than a preset value. When the full-charge state is determined, the control and calculation portion 5 provides information that indicates that the remaining capacity is 100%. The full-charge information can be provided also to the electronic equipment through a communication line.

In order to cut charge or discharge current, the control and calculation portion 5 provides signals to the control component 7 composed of charge and discharge FET elements 71 and 72. The charge FET elements 71 is a p-channel type FET as charge control element. The discharge FET element 72 is a p-channel type FET as discharge control element. The signals control them to ON/OFF. In addition, instead of p-channel type FETs, charge and discharge FETs of n-channel type FETs can be used together with a charge pump. In this case, a p-channel type FET is used as a later-described preliminary charge FET 74.

In the case where the battery 1 is a lithium-ion battery, when the voltage of the battery 1 reaches an over-charge voltage (e.g., 4.2 V/cell) or more, in order to turn the charge FET 71 OFF, the control and calculation portion 5 provides an OFF signal (the OFF signal corresponds to a signal of High voltage, because the OFF signal is applied to a gate of p-channel type FET of the element 71) through a port CH. On the other hand, when the voltage of the battery 1 reaches an over-discharge voltage (e.g., 2.7 V/cell) or less, in order to turn the discharge FET 72 OFF, the control and calculation portion 5 provides an OFF signal (the OFF signal corresponds to a signal of High voltage, because the element 72 applies the OFF signal to a gate of p-channel type FET) through a port DSC. As discussed above, since the signals are applied to the gates of the p-channel type FETs of elements 71 and 72, the voltages of the OFF signals corresponds to signals of High voltage. On the other hand, the voltages of ON signals correspond to signals of Low voltage. In an over-charge voltage state, the control and calculation portion 5 provides the OFF signal through the port CH, and thus stops the charge operation. In this state, since DSC is provided with the ON signal, the discharge FET element 72 is in an ON state, thus, the mobile device PC can perform discharge operation through a parasitic diode (body diode) 71B of the charge FET element 71 in an OFF state. In an over-discharge voltage state, the control and calculation portion 5 provides the OFF signal through the port DSC, and thus stops the discharge operation. In this state, since CH is provided with the ON signal, the charge FET element 71 is in an ON state, thus the mobile device PC can perform charge operation through a parasitic diode (body diode) 72B of the discharge FET element 72 in an OFF state.

The MPU includes a communication portion 9 that transmits various types of battery information such as battery voltage, remaining capacity and charge/discharge current value, and various types of instruction information to the control-and-power means S of the mobile device PC. The communication portion 9 performs communication processing between the battery pack A and the mobile device PC as follows. The communication portion 9 includes a communication data creation portion and a driver portion. The communication data creation portion creates signal data that can be received by the mobile device PC based on the various types of battery information such as battery voltage, remaining capacity and charge/discharge current value. The driver portion performs actual communication. The communication data creation portion uses memories in the control and calculation portion 5 for storing various types of parameters for remaining capacity calculation and various types of data. In addition, the driver portion receives transmission requirement of various types of information about the battery pack from the electronic equipment, and then transmits data created by the communication data creation portion to the electronic equipment. Known SMBus or the like can be used as communication system. The system has transmission/reception function of data signal and so on through two communication lines of data line SDA and clock line SCL.

The battery pack A is used in a case where commercial power is not available, for example, in a case where the mobile device PC is on the road. For this reason, the battery 1 is usually stored in a state close to the full-charge state. On the other hand, a blackout seldom occurs in normal cases. Therefore, the remaining capacity of the battery 1 reduces due to self-discharge of the battery and power consumption in the battery pack A. The charge/discharge control and calculation portion 5 starts recharge operation when the remaining capacity of the battery 1 reduces to a recharge capacity level due to self-discharge, power consumption of the circuit, and so on. The recharge capacity level can be calculated by subtracting integrated current values in preset periods from the full-charge capacity, or can be obtained based on battery voltage corresponding to the recharge remaining capacity level. The recharge remaining capacity level can be set to 90% of the full-charge capacity.

In this embodiment, the charge/discharge control and calculation portion 5 as control circuit determines abnormality of the charge control element as follows. Even though the control and calculation portion 5 controls the charge FET element 71 as charge control element to OFF, if the current detection portion 2 detects charge current, the control and calculation portion 5 determines that abnormality occurs in the following cases. It is determined that abnormality occurs if it is detected that the current flows at a rate not less than a first current value during a first detection period shorter than a second detection period. In addition, it is determined that abnormality occurs if it is detected that the current flows within a preset current range, that is, at a rate less than the first current value and not less than a second current value during the second detection period longer than the first detection period.

As for a control method according to this embodiment, processes will be now described with reference to flow charts of FIGS. 2 through 4. In step S1, the charge/discharge control and calculation portion 5 as control circuit determines whether the charge FET element 71 is controlled to OFF. If NO, in other words, if the charge FET element 71 is controlled to ON, go to step S2, and a counter 1 and a counter 2 as timers are set to zero.

Figure 2:
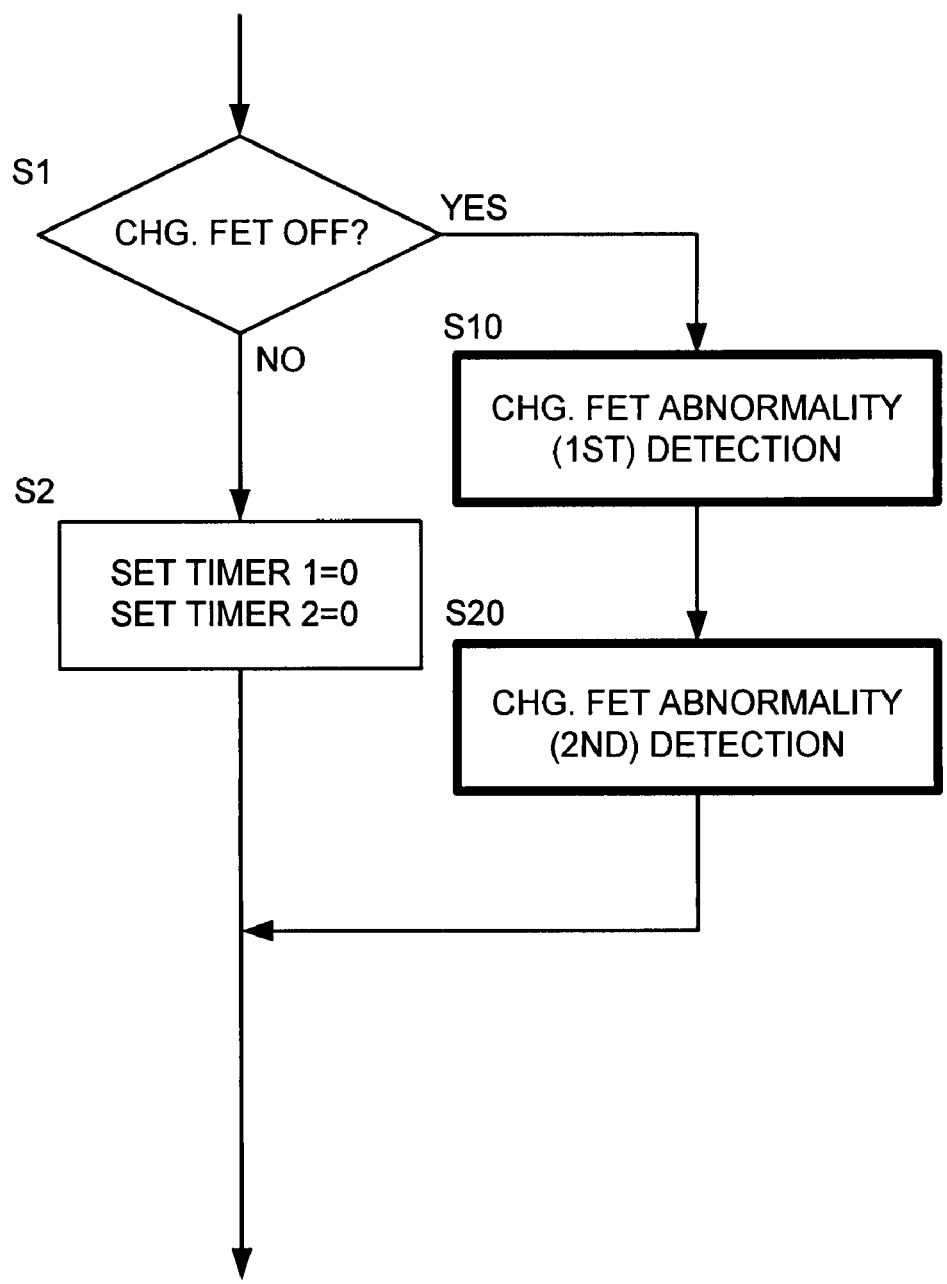
FIG. 2 is a flow chart of one embodiment of the present invention.

In step S1, if YES, in other words, if the charge FET element 71 is controlled to OFF, go to step S10 for charge FET abnormality (first stage) detection processing (=large current short period detection) and step S20 for charge FET abnormality (second stage) detection processing (=small current long period detection), then the flow in FIG. 2 is repeated at a constant cycle period (e.g., 250 msec).

Figure 3:
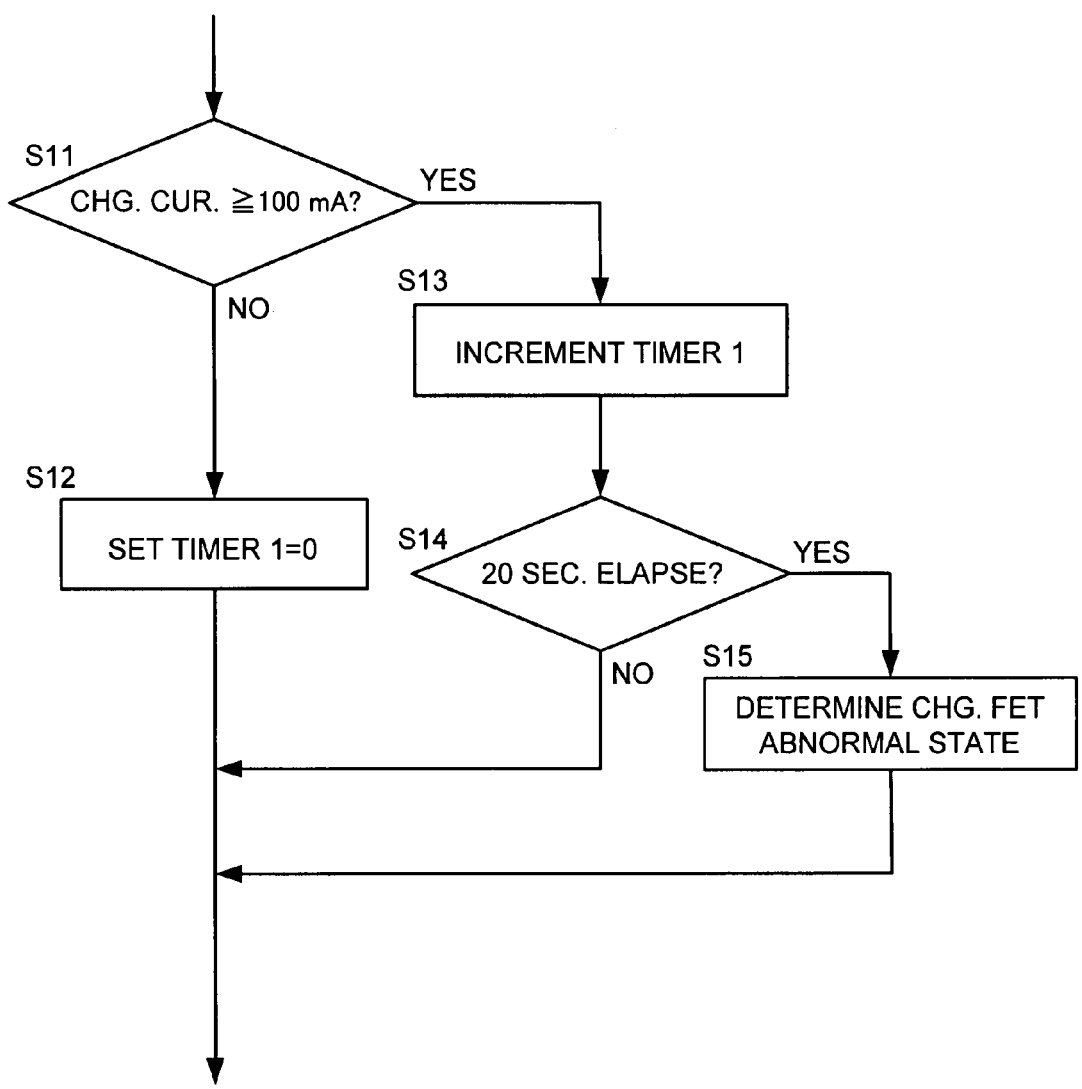
FIG. 3 is a detailed flow chart showing step S10 in FIG. 2 of the present invention.

FIG. 3 is a detailed flow chart showing step S10. In step S11, the charge/discharge control and calculation portion 5 as control circuit detects whether the charge current is not less than the first current value (e.g., 100 mA). In step S11, if NO (=the charge current is less than the first current value), go to step S12, and the counter 1 is set to zero.

In step S11, if YES (=the charge current is not less than the first current value), go to step S13, and the counter 1 is incremented so that time measurement starts. Subsequently, in step S14, it is detected based on the counter 1 whether elapsed time is not less than 20 seconds as first detection period. If NO, in other words, if elapsed time is less than 20 seconds, the flow in FIG. 2 is repeated at the constant cycle period. In step S14, if YES, in other words, if elapsed time is not less than 20 seconds, in step S15, it is detected that the charge current flows at a rate not less than the first current value during the first detection period, thus, the charge/discharge control and calculation portion 5 determines that abnormality occurs.

Figure 4:
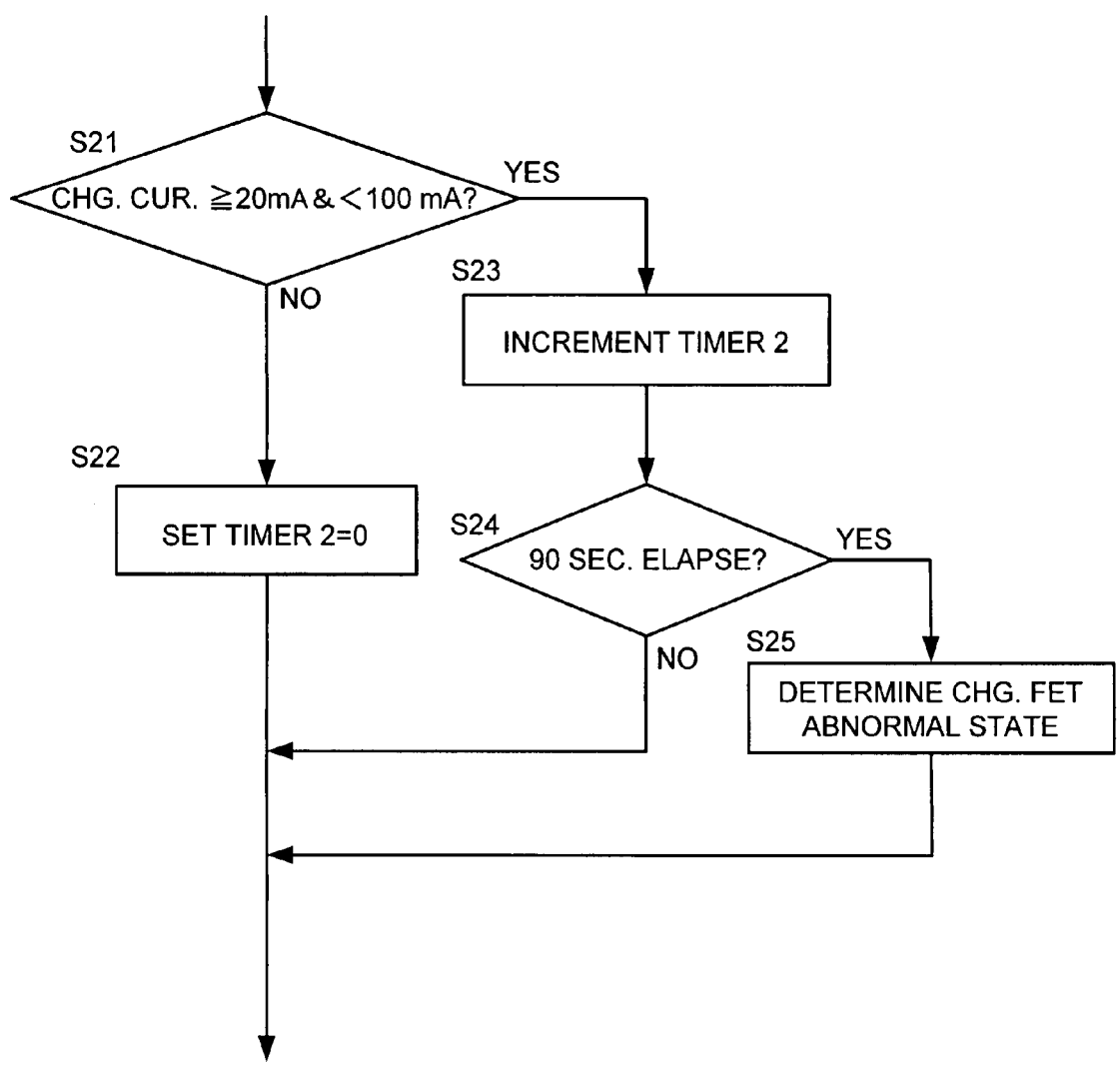
FIG. 4 is a detailed flow chart showing step S20 in FIG. 2 of the present invention.

FIG. 4 is a detailed flow chart showing step S20. In step S21, the charge/discharge control and calculation portion 5 as control circuit detects whether the charge current is less than the first current value (e.g., 100 mA) and not less than the second current value (e.g., 20 mA). In step S21, if NO (=the charge current is not less than the first current value or less than the second current value), go to step S22, and the counter 2 is set to zero. The second current value is less than the first current value, and can be not less than 1 mA corresponding to a value larger than a detection limit current value. In the flow chart of FIG. 4, detection is made whether the charge current is not less than 20 mA corresponding to a value larger than usual noise.

In step S21, if YES (=the charge current is less than the first current value (e.g., 100 mA) and not less than the second current value (e.g., 20 mA)), go to step S23, and the counter 2 is incremented so that time measurement starts. Subsequently, in step S24, it is determined based on the counter 2 whether elapsed time is not less than 90 seconds as a second detection period longer than the first detection period. If NO, in other words, if elapsed time is less than 90 seconds, the flow in FIG. 2 is repeated at the constant cycle period. In step S24, if YES, in other words, if elapsed time is not less than 90 seconds, in step S25, it is detected that the charge current is less than the first current value (e.g., 100 mA) and not less than the second current value (e.g., 20 mA) during the second detection period longer than the first detection period, thus, the charge/discharge control and calculation portion 5 determines that abnormality occurs. In addition, in step S21, although it is detected whether the charge current is less than the first current value (e.g., 100 mA) and not less than the second current value (e.g., 20 mA), instead of this determination, it may be detected only whether the charge current is not less than the second current value (e.g., 20 mA). In this case, if the charge current is not less than 100 mA, in step S23, the counter 2 starts time measurement, however, since the flow in FIG. 2 is repeated at the constant cycle period, in steps S13 and S14 in the charge FET abnormality (former) detection processing (=large current short period detection) of step S10, detection is made based on the counter 1 in a short period, it is possible to determine abnormality.

If it is determined that abnormality occurs, the charge/discharge control and calculation portion 5 informs this abnormal state to the mobile device PC through the communication processing portion 9. The mobile device PC stops charge current supply based on the information about abnormal state. In addition, the mobile device PC takes some action such as stop on the use of the battery pack A. Additionally, as disclosed in Japanese Laid-Open Publication KOKAI No. HEI 9-261883 (FIG. 4) as the aforementioned related art and Japanese Laid-Open Publication KOKAI No. 2000-340267 (FIG. 1), both of which are filed by the assignee of the present invention and incorporated by reference, a fuse H is connected to the battery 1 in serial, and the following construction is provided in order to disconnect the fuse H. In the construction, a disconnection circuit includes a disconnection resistor Rs and a switching element such as FET. The disconnection resistor Rs is thermally coupled to the fuse H. The switching element is connected to the disconnection resistor Rs in serial. The disconnection circuit is connected between a positive side of a rechargeable battery B1 and a negative terminal T2. The charge/discharge control and calculation portion 5 controls a gate signal for the switching element. When the charge/discharge control and calculation portion 5 turns the switching element ON, current flows into the disconnection resistor Rs from the battery 1 or the mobile device PC. Thus, the disconnection resistor Rs generates heat, and the fuse H is disconnected with heat. In this construction, after the fuse H is disconnected, the battery pack A can be out of use.

In the foregoing embodiment, although the charge FET abnormality detection processing is performed in a two-step manner of the large current short period detection in step S10 and the small current long period detection in step S20, the number of current value ranges can be increased. In this case, as current value ranges are higher, detection periods corresponding to them become shorter.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2006-31684 filed in Japan on Feb. 8, 2006, the content of which is incorporated herein by reference.

What is claimed is:

1. A method for controlling a charge current of a battery pack comprising a rechargeable battery, a control circuit that controls a charge operation of the rechargeable battery, and a charge control element controlled by the control circuit so as to control the charge current, the method comprising:
   controlling the charge control element with the control circuit so that the charge control element is turned ON in the charge operation;
   detecting the charge current of the rechargeable battery in the charge operation and measuring a detection time using the control circuit;
   controlling the charge control element with the control circuit so that the charge control element turns OFF, if the control circuit determines that an abnormality occurs based on the charge current and the detection time; and
   while the charge control element is OFF, stopping a charge current supply, when the control circuit determines that a non-charge abnormality has occurred, wherein
   (i) the control circuit determines that the non-charge abnormality has occurred when the charge current detected is greater than or equal to a first predetermined current value for a first predetermined time period, and
   (ii) the control circuit determines that the non-charge abnormality has occurred when the charge current detected is less than the first predetermined current value and not less than a second predetermined current value for a second predetermined time period longer than the first predetermined time period.

2. The method according to claim 1, wherein while the charge control element is OFF, the control circuit repeats a determination of whether the charge current is greater than or equal to the first predetermined current value for the first predetermined time period, and whether the charge current is less than the first predetermined current value and not less than the second predetermined current value for the second predetermined time period that is longer than the first predetermined time period, at a constant cycle period, and thus determines if the non-charge abnormality occurs.

3. The method according to claim 1, wherein the first predetermined current value is 100 mA, and the first predetermined time period is 20 sec.

4. The method according to claim 1, wherein the second predetermined current value is 20 mA, and the second predetermined time period is 90 sec.

5. The method according to claim 1, wherein the second predetermined current value is not less than 1 mA.

6. The method according to claim 1, wherein the rechargeable battery is a nickel-hydrogen battery.

7. The method according to claim 1, wherein the rechargeable battery is a lithium-ion rechargeable battery.

8. The method according to claim 1, wherein a switching transistor is used as the charge control element.

9. The method according to claim 1, wherein the control circuit provides an OFF signal to the charge control element and thus controls the charge control element so that the charge control element turns to OFF.

10. The method according to claim 1, further comprising:
    controlling the charge control element with the control unit so that the charge control element is turned to OFF if at least one of a full-charge state, an abnormal current, an abnormal temperature, or an abnormal voltage is detected.

11. The method according to claim 10, further comprising:
    controlling the charge control element with the control circuit so that the charge control element turns to OFF if a voltage drop $-\Delta V$ relative to the peak voltage of battery voltage is detected, thus determining that the battery is in the full-charge state, wherein the rechargeable battery is a nickel hydrogen battery.

12. The method according to claim 10, further comprising:
    controlling the charge control element so that the charge control element turns to OFF if a battery voltage is not less than a preset value and the charge current is not more than a preset value is detected, thus determining that the battery is in the full-charge state, wherein the rechargeable battery is a lithium-ion rechargeable battery.

13. The method according to claim 1, wherein the control circuit communicates with an external device through a communication processing portion if an abnormality of the battery is detected.

* * * * *